June 4, 1968 R. L. KASABACK 3,386,265
TORSIONALLY RESILIENT DRIVE
Filed Sept. 27, 1966

INVENTOR
Ronald L. Kasaback
BY
Ralph Hammar
ATTORNEY 3,386,265
TORSIONALLY RESILIENT DRIVE
Ronald L. Kasaback, Erie, Pa., assignor to Lord Corporation, Erie, Pa., a corporation of Pennsylvania
Filed Sept. 27, 1966, Ser. No. 582,380
8 Claims. (Cl. 64—27)

This invention is a torsionally resilient clutch plate having a soft spring rate at low loads for overcoming clutch chatter and having a stiff spring rate at high loads for accommodating peak shock torques. The clutch plate incorporates elastomeric springs having hyperbolic load deflection curves.

Figure 1:
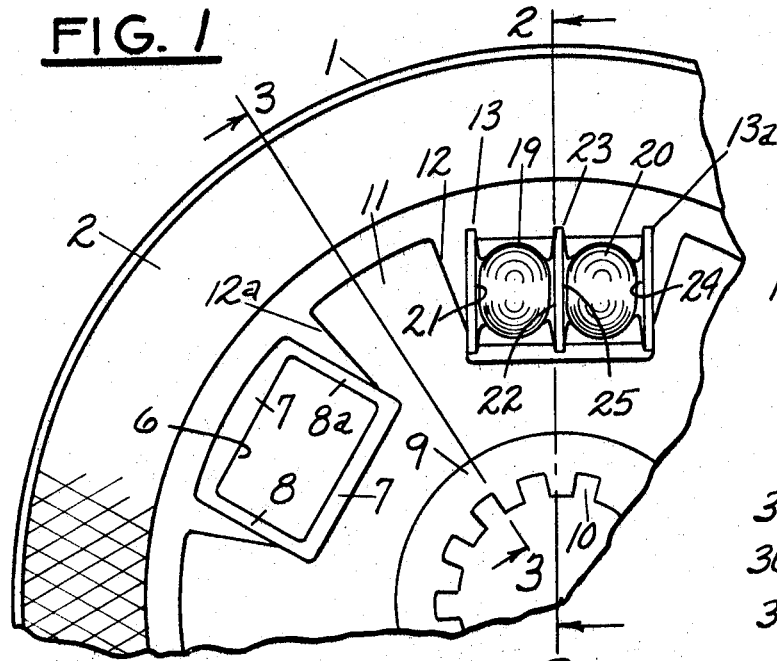
Figure 4:
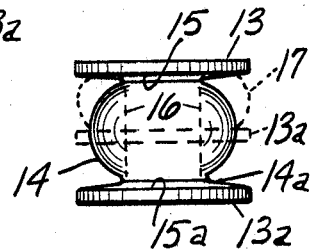
Figure 6:
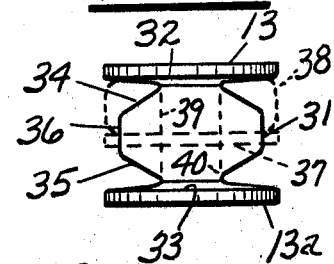
Figure 2:
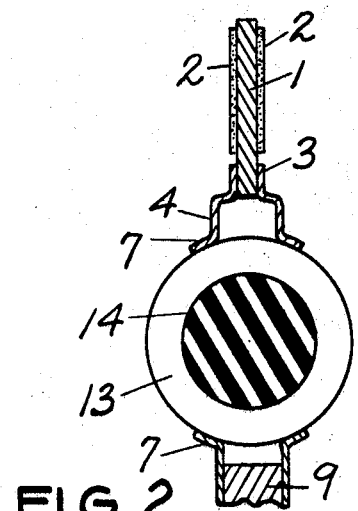
Figure 3:
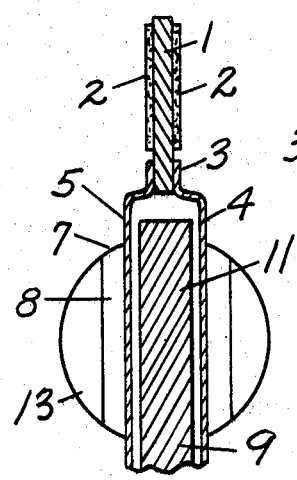
Figure 5:
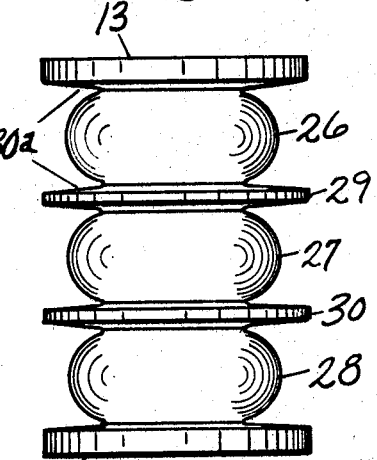
Figure 7:
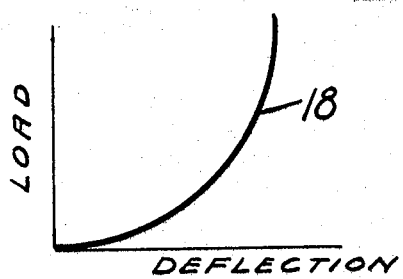

In the drawing, FIG. 1 is an end view partly broken away of a preferred form of clutch plate, FIGS. 2 and 3 are sections on the correspondingly numbered lines, FIGS. 4, 5 and 6 are elevations of elastomeric springs for substitution in the clutch plate, and FIG. 7 is a load deflection curve.

The clutch plate comprises an annular member 1 carrying suitable clutch facing 2. The inner edge of the member 1 is fixed between outwardly extending rims 3 of opposed dished members 4. In the bottom walls 5 of the dished members are formed rectangular windows 6 having tangentially extending guide surfaces 7 at the inner and outer sides of the window and tangentially facing thrust surfaces 8, 8a at opposite ends of each window. The clutch plate is driven by a sprocket having a hub 9 with splines 10 for connection to a shaft and having angularly spaced radially projecting drive fingers 11 arranged between adjacent windows 6. The fingers have on opposite sides circumferentially facing thrust surfaces 12 and 12a, the thrust surface 12 being adjacent the thrust surface 8 of one window and the thrust surface 12a being adjacent the thrust surface 8a of another window. The parts so far described are or may be of common construction and may differ substantially in appearance from the particular construction illustrated.

In each of the windows 6 is arranged an elastomeric spring of the type shown in FIGS. 1, 4, 5 and 6. Each of these springs has an end plate 13 adjacent the thrust surfaces 8 and 12 and an end plate 13a adjacent the thrust surfaces 8a and 12a. At no load, the springs are under slight compression and the end plates 13 and 13a are respectively seated on the thrust surfaces 8, 12 and 8a, 12a. Under torsional load in a clockwise direction as viewed in FIG. 1, the sprocket 9 rotates clockwise relative to the clutch plate and the springs are compressed between thrust surfaces 12 and 8a. Torque in the reverse direction compresses the springs between thrust surfaces 12a and 8. As shown in FIGS. 3 and 4, the end plates are circular in shape and are guided on the longitudinally or tangentially extending guide flanges 7 and between the plates are arranged one or more elastomeric bodies as shown in FIGS. 1, 4, 5 and 6. The purpose of the elastomeric bodies is to provide a torsionally resilient connection between the drive sprocket 9 and the clutch plate 1 to cushion chatter, shock and vibration.

In the simplest form of spring shown in FIG. 4, the body 14 of elastomer is of generally spherical shape with reduced area end portions 15 and 15a bonded to the centers of the adjacent end plates 13 and 13a. There may be a thin skin 14a of elastomer bonded to the end plates outside the end portions 15 and 15a but this does not change the characteristics of the springs. At light loads, the stiffness is approximately that due to the column of rubber between dotted lines 16, thereby providing the soft spring rate desirable for low speed or low torque. This provides the required softness for preventing clutch chatter. At the maximum load, the end plate 13a moves to the position shown in dotted lines corresponding to approximately a 50% deflection of the elastomer. In this position, the body of elastomer rolls out over the adjacent surfaces of the end plates 13 and 13a (or over the skin of elastomer on the end plates) and assumes the position indicated by dotted lines 17. The load is still carried through the elastomer and torsional vibrations are cushioned. The area of the ends of the elastomer in contact with (or in thrust transmitting relation to) the plates 13 and 13a is now from three to ten times as great as the initial area of contact and the stiffness or spring rate approaches that of a column of elastomer from three to ten times the cross sectional area between the dotted lines 16. This provides the required stiffness to stand high torque or shock loads. These high torque loads do not affect the bond between the ends 15 and 15a of the elastomer and the end plates 13 and 13a because the elastomer which has rolled out over the adjacent surfaces of the end plates protects the bond from stress. The spring characteristics are the hyperbolic curve shown at 18 in FIG. 7.

The mounting of FIG. 1 has two bodies 19, 20 of elastomer, each of the same general shape illustrated at 14. The body 19 has a reduced end portion bonded at 21 to the end plate 13 and a reduced end portion bonded at 22 to an intermediate plate 23. The body of elastomer 20 has reduced end portions bonded at 24 to the end plate 13a and bonded at 25 to the intermediate plate 23. The mounting shown in FIG. 1 is capable of deflection of 50% of its height and each of the bodes 19 and 20 when so deflected assumes the position corresponding to that shown by dotted lines 17 in FIG. 4. The spring in FIG. 1 has the same hyperbolic load deflection curve of FIG. 7 but is capable of longer travel. The mounting shown in FIG. 5 still further increases the travel by using three elastomeric bodies 26, 27, 28 and two intermediate plates 29 and 30. FIG. 5 shows the bonded skins 30a outside the reduced area ends of the bodies.

In the spring of FIG. 6, the end plates 13 and 13a are bonded to a body 31 of elastomer having ends 32, 33 of reduced cross section bonded to the surfaces. The ends of the elastomer are bevelled as indicated at 34, 35 and the enlarged central section or waist 36 between the ends of the bevels is shown as straight, although this is not critical.

When deflected to substantially 50% of the height of the column, the plate 13a occupies the position indicated by dotted line 37 and the surfaces of the elastomer intermediate the load carrying surfaces assume the position indicated by dotted line 38. As in the other springs, it will be noted that the end surfaces of the elastomer outside the areas 32, 33 have in effect been laid down against the load carrying end plates 13, 13a and the intermediate sections of the elastomer indicated by the numeral 36 have been bulged outwardly to the position indicated by the dotted line 38. The FIG. 6 spring is equivalent to the FIG. 4 spring but is somewhat easier to make. Initially, the stiffness is comparable to a column of elastomer between lines 39 and 40, providing the soft spring rate desirable for light loads. In the fully loaded condition indicated by line 38, the cross sectional area in load carrying relation between the plates 13 and 13a has increased substantially ten fold with a consequent increase in stiffness desirable for carrying heavy loads.

To obtain long life at high strain, the following structural characteristics of the springs should be observed: First, the column of elastomer should have a relation between the length and cross section which will prevent buckling under compression (Applied Mechanics, Fuller and Johnston, vol. II, copyright 1919, pp. 21, 346–364). This relation is determined by experiment. For a cylinder of uniform cross section the length or height should be no greater than twice the diameter. Enlarging the central section of the column decreases the tendency to buckle. For FIGS. 1 and 5, the height is measured between adjacent plates, i.e. between 13 and 23 etc. Buckling reduces the load carrying ability. Second, the cross sectional area of the column of elastomer effective for light loads (i.e. 16 or 39, 40) should be substantially less than, e.g. from one tenth to one half, the maximum cross sectional area between the ends. Third, the ends of the elastomer should diverge from the load carrying plates (or from the skins of elastomer on the plates) at an acute angle so that under load the elastomer swings or is laid down into contact with the load carrying plates (or skins). For arcuate surfaces such as shown in FIGS. 1, 4 and 5, the angle should be measured midway between the ends of the arc. The included volume between the projection of the elastomer on the load carrying plates at no load and the adjacent bonded end surfaces of the elastomer should be less than the volume of elastomer displaced when compressed under full load. The idea is to establish load carrying contact with the ends of the elastomer in such a manner as to avoid stress concentration at the bond between the elastomer and the plates.

The elastomeric springs may be substituted in clutch plates using steel springs. The elastomeric springs do not exhibit the low fatigue life of the steel springs. No additional space is required for the substitution. At low loads, the elastomeric springs provide a low natural frequency which provides isolation of gear chatter and engine firing. Upon increasing torsional load, the spring rate increases in a hyperbolic, but almost bilinear, fashion and provides further flexibility for isolation. The springs never bottom out under load; consequently, metal component failures do not occur. Torsional peaks at critical speeds and shock loading are reduced to tolerable values, and are damped by the internal friction of the elastomer.

What is claimed as new is:

1. In a torsionally resilient drive, relatively rotatable first and second members, one member being a driving member and the other member being a driven member, a torsionally resilient drive between the members comprising a pair of angularly spaced tangentially extending elastomeric springs, a finger on the second member in the space between the springs, each spring having spaced end plates, one end plate of each spring being adjacent the finger and the other end plate of each spring being remote from the finger, elastomeric means between the end plates and having ends of reduced area bonded to the end plates, the elastomer diverging from the end plate to which it is bonded to a larger area intermediate section of elastomer whereby under compression load the elastomer of said larger area intermediate section swings down against the end plates outside said ends and protects the bond to said ends, said first member having a thrust surface providing a seat for each end plate, said finger having a thrust surface facing the adjacent end plate of each spring whereby movement of the second member relative to the first member in one direction lifts the adjacent end plate of one spring off its seat to compress the elastomer of said one spring while movement of the second member relative to the first member in the opposite direction lifts the adjacent end plate of the other spring off its seat to compress the elastomer of said other spring.

2. The drive of claim 1 in which each spring has a plurality of tangentially extending elastomeric bodies in end to end relation with intermediate plates between and bonded to the ends of adjacent bodies, the ends of the bodies adjacent the intermediate plates diverging at an acute angle from the respective plates to which they are bonded to a larger area intermediate section of elastomer.

3. The drive of claim 1 in which the drive comprises a series of said springs angularly spaced from each other and in which the second member has a series of fingers, each disposed between the springs.

4. The drive of claim 1 in which the elastomeric means of each spring is a stable column of elastomer.

5. The drive of claim 1 in which the first member has spaced walls with tangentially extending guides for the end plates of each spring and the finger is between said walls.

6. The drive of claim 5 in which the tangentially extending guides are provided by inner and outer sides of windows in said walls and in which the seats for the end plates are provided by ends of the windows.

7. The drive of claim 4 in which the area of the intermediate section is several times the area of the ends.

8. The drive of claim 1 in which the elastomer diverges from the associated end plates at an acute angle.

References Cited

UNITED STATES PATENTS

| 2,145,542 | 1/1939 | Gee | 64—27 |
| 2,533,789 | 12/1950 | Goodchild | 64—27 |
| 2,964,930 | 12/1960 | Aira et al. | 64—27 |

FOREIGN PATENTS

| 715,512 | 9/1954 | Great Britain. |

HALL C. COE, *Primary Examiner*.